United States Patent
Kawamura et al.

(10) Patent No.: US 11,505,240 B2
(45) Date of Patent: Nov. 22, 2022

(54) STEERING CONTROL DEVICE

(71) Applicant: JTEKT CORPORATION, Osaka (JP)

(72) Inventors: Hiroshi Kawamura, Okazaki (JP); Yuji Fujita, Okazaki (JP)

(73) Assignee: JTEKT CORPORATION, Aichi (JP)

( * ) Notice: Subject to any disclaimer, the term of this patent is extended or adjusted under 35 U.S.C. 154(b) by 422 days.

(21) Appl. No.: 16/701,218

(22) Filed: Dec. 3, 2019

(65) Prior Publication Data

US 2020/0172153 A1     Jun. 4, 2020

(30) Foreign Application Priority Data

Dec. 3, 2018 (JP) .............................. JP2018-226545
Oct. 29, 2019 (JP) .............................. JP2019-196274

(51) Int. Cl.
*B62D 11/00* (2006.01)
*B62D 5/04* (2006.01)
(Continued)

(52) U.S. Cl.
CPC .............. *B62D 5/046* (2013.01); *H02P 25/22* (2013.01); *H02P 27/085* (2013.01); *H02P 29/50* (2016.02); *B62D 5/0409* (2013.01)

(58) Field of Classification Search
CPC ........ B62D 5/046; B62D 6/10; B62D 5/0463; B62D 5/0481; H02P 29/032; H02P 29/028; H02P 25/22
See application file for complete search history.

(56) References Cited

U.S. PATENT DOCUMENTS

2004/0112147 A1* 6/2004 Mir .................... G01L 3/104
                                             73/862.331
2014/0102219 A1* 4/2014 Kuwahara ............ B62D 5/0481
                                             73/862.333

(Continued)

FOREIGN PATENT DOCUMENTS

EP           3281844 A1    2/2018
EP           3496266 A1    6/2019
JP       2011-195089 A    10/2011

OTHER PUBLICATIONS

Apr. 30, 2020 Extended Search Report issued in European Patent Application No. 19212531.8.

*Primary Examiner* — Kawing Chan
*Assistant Examiner* — Gabriel Agared
(74) *Attorney, Agent, or Firm* — Oliff PLC

(57) ABSTRACT

A steering control device includes a first control system and a second control system. The first control system includes and a first microcomputer. The first microcomputer is configured to compute a first command value for controlling power supply to a first coil and a second command value for controlling power supply to a second coil. The second control system includes and a second microcomputer. The second microcomputer is configured to compute the first command value and the second command value. The first microcomputer and the second microcomputer are configured to communicate the first command value and the second command value with each other. The cycle of communication between the first microcomputer and the second microcomputer is set to be equal to or shorter than each of the cycles of computations of the first command value and the second command value by the first microcomputer and the second microcomputer.

2 Claims, 7 Drawing Sheets

(51) Int. Cl.
*H02P 29/50* (2016.01)
*H02P 25/22* (2006.01)
*H02P 27/08* (2006.01)

(56) References Cited

U.S. PATENT DOCUMENTS

2018/0043928 A1* 2/2018 Fujita .................... B62D 5/046
2019/0326843 A1  10/2019 Kawai et al.

* cited by examiner

STEERING CONTROL DEVICE

CROSS-REFERENCE TO RELATED APPLICATION

This application claims priority to Japanese Patent Application No. 2019-196274 filed on Oct. 29, 2019 and Japanese Patent Application No. 2018-226545 filed on Dec. 3, 2018, incorporated herein by reference in their entireties.

BACKGROUND

1. Technical Field

The present disclosure relates to a steering control device.

2. Description of Related Art

There is known a steering system that assists a driver in performing a steering operation by applying a drive force of a motor to a steering mechanism of a vehicle. Such a steering system incorporates an electronic control unit (ECU) that controls operation of the motor. For example, Japanese Unexamined Patent Application Publication No. 2011-195089 (JP 2011-195089 A) describes a device provided with a plurality of systems that control drive of a motor. In this case, the device is provided with respective coils corresponding to the systems, and respective control systems that control power supply to the coils corresponding to the systems. Each of the control systems includes a microcomputer that has a current command value computation unit that computes a current command value for controlling drive of the motor, and a feedback control unit that causes a value of an actual current, which is supplied to the coil, to follow the current command value.

SUMMARY

For example, the current command value computation unit of the microcomputer of one of the control systems transmits the computed current command value to the feedback control unit of the microcomputer of the one control system. The current command value computation unit of the microcomputer of the one control system also transmits the computed current command value to the feedback control unit of the microcomputer of the other control system through communication between the microcomputer of the one control system and the microcomputer of the other control system. Meanwhile, the current command value computation unit of the microcomputer of the other control system transmits the computed current command value to the feedback control unit of the microcomputer of the other control system. The current command value computation unit of the microcomputer of the other control system also transmits the computed current command value to the feedback control unit of the microcomputer of the one control system through communication between the microcomputer of the one control system and the microcomputer of the other control system. The feedback control unit of the microcomputer of the one control system and the feedback control unit of the microcomputer of the other control system execute feedback control using either the current command value that is computed by the current command value computation unit of the microcomputer of the one control system or the current command value that is computed by the current command value computation unit of the microcomputer of the other control system.

Some control systems include respective oscillators that generate a clock. A frequency of the clock from the oscillator, that is, a cycle of the clock, are occasionally fluctuated among the individual oscillators, and thus the cycle of the clock from the oscillator of the one control system occasionally differs from the cycle of the clock from the oscillator of the other control system. In this case, since various portions of the control systems prescribe the time using the cycle of the clock, the time prescribed by the one control system differs from the time prescribed by the other control system. Since the various portions of the control systems prescribe the process timing using the cycle of the clock, a shift between the process timing of the various portions of the one control system and the process timing of the various portions of the other control system may be varied temporally. Such temporal variations in the shift between the process timings are repeated in predetermined cycles. For example, the microcomputer of the other control system cannot grasp the current command value which is computed by the microcomputer of the one control system in the present computation cycle, even if the current command value that is computed by the one control system is transmitted to the other control system, in the case where the timing when the other control system receives the current command value is delayed from the timing when the one control system transmits the command value because of the fluctuations in the clock among the oscillators. Even if a current command value for the present computation cycle is computed by the current command value computation unit of the microcomputer of the one control system, the feedback control unit of the microcomputer of the other control system performs the feedback control using the current command value that was received when the preceding communication was established, until communication is established between the microcomputer of the one control system and the microcomputer of the other control system. The current command value that was received when the preceding communication was established is a current command value computed in a past computation cycle, which was computed earlier than the current command value for the present computation cycle. In this case, in the case where the current command value computation unit of the microcomputer of the one control system computes the present current command value immediately after communication is performed between the microcomputer of the one control system and the microcomputer of the other control system, the feedback control unit of the microcomputer of the other control system performs the feedback control using the current command value, that was received when the preceding communication was established, for up to about one cycle of communication. In this way, power may not be supplied to the coils of the motor more optimally since the feedback control unit of the microcomputer of the other control system performs the feedback control using the current command value that was received when the preceding communication was established. In this case, torque ripple may be caused.

The present disclosure provides a steering control device in which drive of a motor can be controlled with respective control systems using more optimal command values.

One aspect of the present disclosure provides a steering control device that controls drive of a motor, which applies torque to a steering mechanism, through a plurality of control systems. The plurality of control systems include a first control system provided with a first coil and configured to control power supply to the first coil, and a second control system provided with a second coil and configured to control power supply to the second coil. The first control system includes a first oscillator and a first microcomputer. The first microcomputer is configured to generate a clock for prescribing a process timing of the first microcomputer based on a first clock input from the first oscillator. The first microcomputer is configured to compute a first command value for controlling power supply to the first coil and a second command value for controlling power supply to the second coil. The first microcomputer is configured to execute first feedback control, which cause a value of a first actual current, which is supplied to the first coil, to follow the first command value. The second control system includes a second oscillator and a second microcomputer. The second microcomputer is configured to generate a clock for prescribing a process timing of the second microcomputer based on a second clock input from the second oscillator. The second microcomputer is configured to compute the first command value and the second command value. The second microcomputer is configured to execute second feedback control, which cause a value of a second actual current, which is supplied to the second coil, to follow the second command value. The first microcomputer and the second microcomputer are configured to communicate the first command value and the second command value with each other by the first microcomputer transmitting the computed second command value to the second microcomputer and the second microcomputer transmitting the computed first command value to the first microcomputer. The first microcomputer is configured to execute the first feedback control using the first command value that is computed by the first microcomputer or the first command value that is computed by the second microcomputer, and the second microcomputer is configured to execute the second feedback control using the second command value that is computed by the first microcomputer or the second command value that is computed by the second microcomputer. A cycle of communication between the first microcomputer and the second microcomputer is set to be equal to or shorter than each of cycles of computations of the first command value and the second command value by the first microcomputer and the second microcomputer.

With the steering control device according to the one aspect of the present disclosure, the cycle of communication between the first control system and the second control system is set to be equal to or shorter than each of the cycles of computations of the first command value and the second command value by the first microcomputer and the second microcomputer. From the above, the period for which the second control system cannot grasp the second command value that is computed in the present computation cycle can be shortened, even if the first microcomputer computes the second command value immediately after communication between the first control system and the second control system is performed because of fluctuations in the cycle of the clocks from the oscillators, since the cycle of communication is equal to or shorter than each of the cycles of computations of the command values. Consequently, the period for which the second microcomputer performs the feedback control using the second command value that was computed in the past computation cycle and that was received when the preceding communication was established can be shortened. In addition, the period for which the first control system cannot grasp the first command value that is computed in the present computation cycle can be shortened, even if the second microcomputer computes the first command value immediately after communication between the first control system and the second control system is performed, since the cycle of communication is equal to or shorter than each of the cycles of computations of the command values. Therefore, the period for which the first microcomputer and the second microcomputer perform the feedback control using the command values from the past computation cycle, which were computed earlier than the command values that are computed in the present computation cycle, can be shortened. That is, a shift between the process timing of the first microcomputer and the process timing of the second microcomputer can be suppressed. Consequently, torque ripple can be suppressed. In this manner, drive of the motor can be controlled with the control systems using command values from more optimal computation cycles.

In the steering control device according to the one aspect of the present disclosure, the cycle of the communication between the first microcomputer and the second microcomputer may be set to be equal to or shorter than each of cycles of the first feedback control and the second feedback control by the first microcomputer and the second microcomputer. The first microcomputer and the second microcomputer may perform the first feedback control and the second feedback control in cycles that is shorter than each of the cycles of the computations of the first command value and the second command value by the first microcomputer and the second microcomputer.

With the steering control device according to the one aspect of the present disclosure, the cycle of communication is set to be equal to or shorter than each of the cycles of first feedback control and the second feedback control which is further shorter than each of the cycles of computations of the first command value and the second command value. Consequently, the period for which the first microcomputer and the second microcomputer perform the feedback control using the command values from the past computation cycle, which were computed earlier than the command values that are newly computed, can be shortened.

In the steering control device according to the one aspect of the present disclosure, the first control system may include a first drive circuit, and the second control system may include a second drive circuit. The first microcomputer may be configured to compute a first duty command value through the first feedback control. The first microcomputer may be configured to generate a first PWM signal based on the first duty command value. The first drive circuit may be configured to execute power supply to the first coil based on the first PWM signal. The second microcomputer may be configured to compute a second duty command value through the second feedback control. The second microcomputer may be configured to generate a second PWM signal based on the second duty command value. The second drive circuit may be configured to execute power supply to the second coil based on the second PWM signal. The cycle of the communication between the first microcomputer and the second microcomputer may be set to be equal to or shorter than each of a cycle of update of the first PWM signal and a cycle of update of the second PWM signal Each of the cycle of update of the first PWM signal and the cycle of update of the second PWM signal may be set to be shorter than each of cycles of the first feedback control and the second feedback control by the first microcomputer and the second microcomputer.

With the steering control device according to the one aspect of the present disclosure, the cycle of communication is set to be equal to or shorter than each of the cycle of update of the first PWM signal and the cycle of update of the second PWM signal. Consequently, the period for which the first microcomputer and the second microcomputer perform the feedback control using the command values from the past computation cycle, which were computed earlier than the command values that are newly computed, can be shortened.

With the steering control device according to the one aspect of the present disclosure, drive of the motor can be controlled with the control systems using command values from more optimal computation cycles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
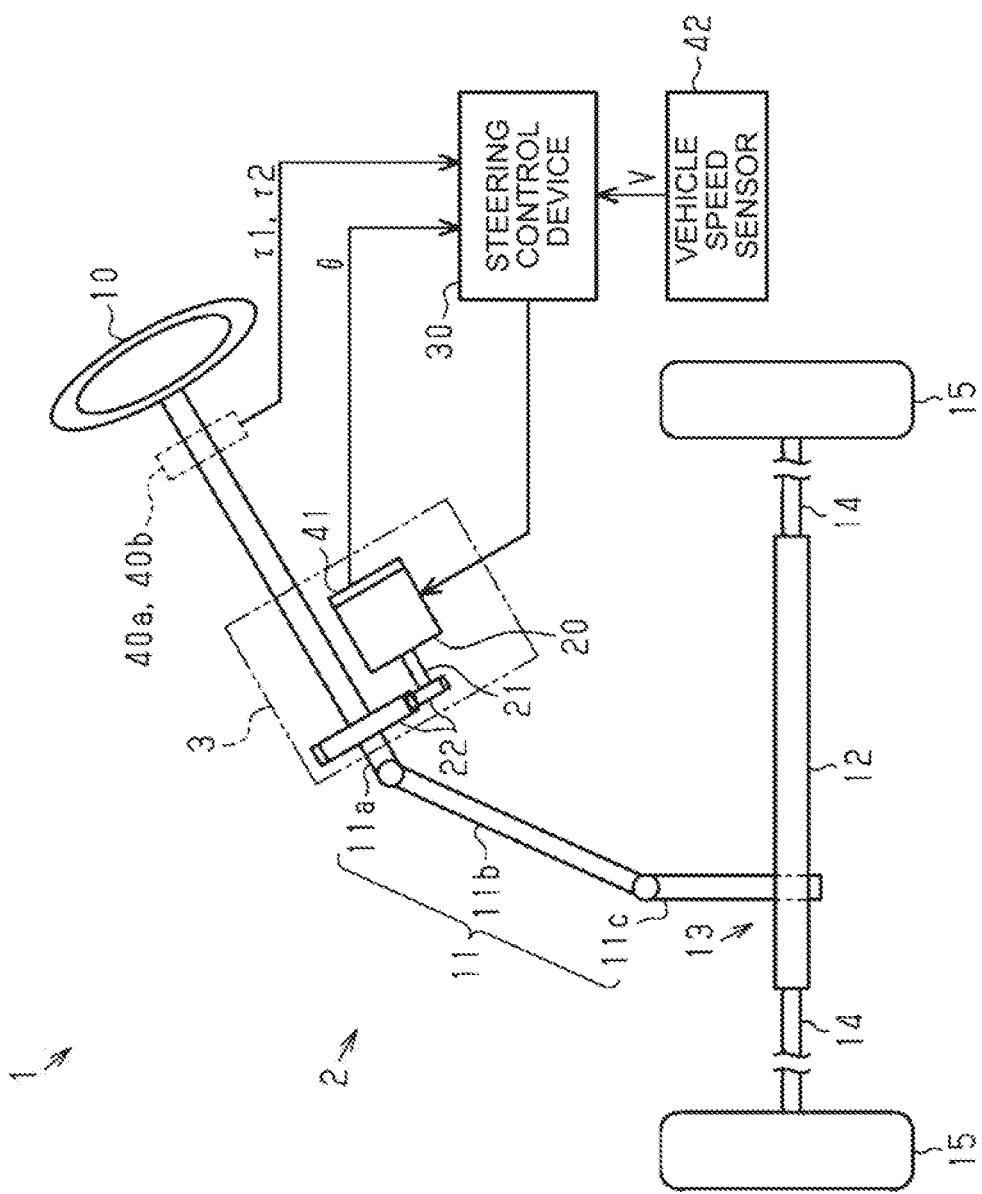
FIG. 1 is a view illustrating a schematic configuration of a steering system that incorporates a steering control device.

A first embodiment in which a steering control device is applied to an electric power steering system (hereinafter referred to as an "EPS") will be described. As illustrated in FIG. 1, an EPS 1 includes a steering mechanism 2 that steers steered wheels 15 based on an operation of a steering wheel 10 performed by a driver, an assist mechanism 3 that assists the driver in performing a steering operation, and a steering control device 30 that controls the assist mechanism 3.

The steering mechanism 2 includes the steering wheel 10 which is operated by the driver, and a steering shaft 11 that rotates together with the steering wheel 10. The steering shaft 11 has a column shaft 11a coupled to the steering wheel 10, an intermediate shaft 11b coupled to a low end portion of the column shaft 11a, and a pinion shaft 11c coupled to a low end portion of the intermediate shaft 11b. The low end portion of the pinion shaft 11c is coupled to a rack shaft 12 via a rack-and-pinion mechanism 13. Rotational motion of the steering shaft 11 is converted into reciprocal linear motion of the rack shaft 12 in an axial direction (right-left direction in FIG. 1) via the rack-and-pinion mechanism 13. The reciprocal linear motion of the rack shaft 12 is transferred to the right and left steered wheels 15 via tie rods 14 coupled to both ends of the rack shaft 12 to vary the steered angle of the steered wheels 15 and change the advancing direction of the vehicle.

The assist mechanism 3 includes a motor 20 that has a rotary shaft 21, and a speed reduction mechanism 22. The motor 20 applies torque to the steering shaft 11. The rotary shaft 21 of the motor 20 is coupled to the column shaft 11a via the speed reduction mechanism 22. The speed reduction mechanism 22 reduces the speed of rotation of the motor 20, and transfers a rotational force at the reduced speed to the column shaft 11a. That is, the torque of the motor 20 is applied to the steering shaft 11 to assist the driver in performing a steering operation.

Figure 2:
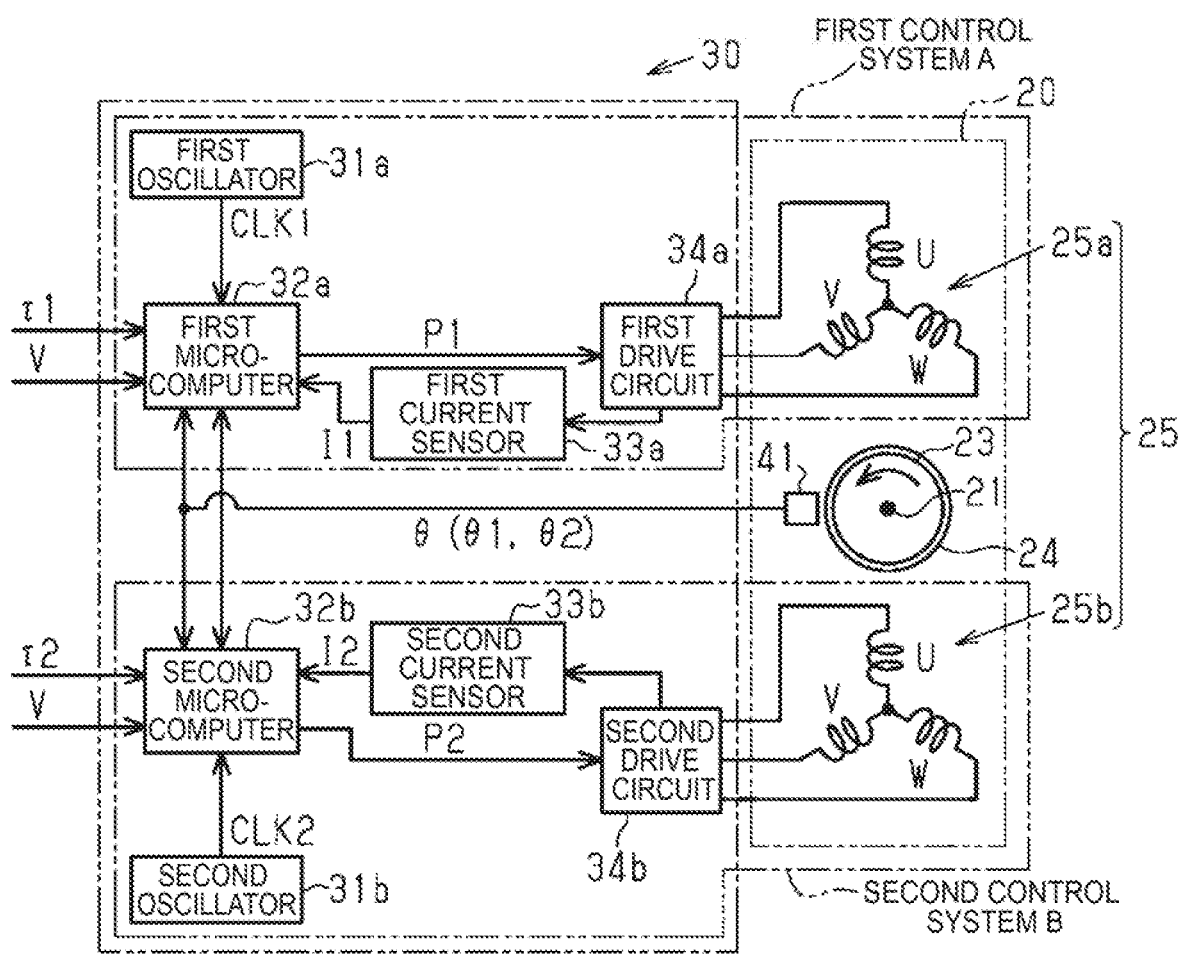
FIG. 2 is a block diagram illustrating a schematic configuration of the steering control device.

As illustrated in FIG. 2, the motor 20 includes a rotor 23 that rotates about the rotary shaft 21, and a stator 24 disposed at the outer periphery of the rotor 23. Permanent magnets are fixed to the surface of the rotor 23. The permanent magnets are disposed such that different polarities (N pole and S pole) are arranged alternately in the circumferential direction of the rotor 23. The permanent magnets form a magnetic field when the motor 20 is rotated. The stator 24 includes coils 25 for three phases (U-phase, V-phase, and W-phase) disposed in a circular ring shape. The coils 25 have a first coil 25a and a second coil 25b. The first coil 25a and the second coil 25b each include coils for U-phase, V-phase, and W-phase connected through a star connection. The steering control device 30 is connected to the motor 20. The steering control device 30 is a control unit that controls drive of the motor 20 by controlling the amount of current which is a control amount for the motor 20.

As illustrated in FIG. 1, the steering control device 30 controls the motor 20 based on the results of detection performed by various sensors provided in the vehicle. Examples of the various sensors include a first torque sensor 40a and a second torque sensor 40b that serve as torque detection devices, a rotational angle sensor 41, and a vehicle speed sensor 42. The first torque sensor 40a and the second torque sensor 40b are provided to the column shaft 11a. The rotational angle sensor 41 is provided to the motor 20. The first torque sensor 40a detects first steering torque $\tau 1$ to be applied to the steering shaft 11 along with a steering operation by the driver. Meanwhile, the second torque sensor 40b detects second steering torque $\tau 2$ to be applied to the steering shaft 11 along with a steering operation by the driver. The rotational angle sensor 41 detects a rotational angle $\theta$ of the rotary shaft 21 of the motor 20. The rotational angle $\theta$ which is input from the rotational angle sensor 41 to a first microcomputer 32a is defined as a first rotational angle $\theta 1$. Meanwhile, the rotational angle $\theta$ which is input from the rotational angle sensor 41 to a second microcomputer 32b is defined as a second rotational angle $\theta 2$. The vehicle speed sensor 42 detects a vehicle speed V which is the travel speed of the vehicle. The steering control device 30 sets target torque for the motor 20 to be applied to the steering mechanism 2 based on output values from the sensors, and controls a current to be supplied to the motor 20 such that the actual torque of the motor 20 becomes the target torque.

The function of the steering control device 30 will be described with reference to FIG. 2. The steering control device 30 has a first control system A that controls power supply to the first coil 25a, and a second control system B that controls power supply to the second coil 25b. In the first embodiment, in the case where an abnormality in which control for drive of the motor 20 cannot be continued occurs in the first control system A, for example, a transition is made to fail-safe control in which control for power supply to the motor 20 by the first control system A is stopped and power supply to the motor 20 is controlled by only the second control system B. In the case where an abnormality in which control for drive of the motor 20 cannot be continued occurs in the second control system B, on the other hand, a transition is made to fail-safe control in which control for power supply to the motor 20 by the second control system B is stopped and power supply to the motor 20 is controlled by only the first control system A.

The first control system A of the steering control device 30 has a first oscillator 31a, the first microcomputer 32a, a first current sensor 33a, and a first drive circuit 34a. The second control system B of the steering control device 30 has a second oscillator 31b, the second microcomputer 32b, a second current sensor 33b, and a second drive circuit 34b. The first oscillator 31a and the second oscillator 31b have the same configuration. The first microcomputer 32a and the second microcomputer 32b have the same configuration. The first current sensor 33a and the second current sensor 33b have the same configuration. The first drive circuit 34a and the second drive circuit 34b have the same configuration. The term "same configuration" as used in relation to the first embodiment refers to having the same function and performance under the same design concept.

The first oscillator 31a generates a first clock CLK1 at a basic frequency. The first oscillator 31a may be a crystal element, for example. The various portions of the first control system A operate at predetermined process timings based on the first clock CLK1.

The first drive circuit 34a is a drive circuit for three phases (U-phase, V-phase, and W-phase). The first drive circuit 34a is formed by connecting three arms, in each of which two switching elements are connected in series with each other, in parallel with each other between the + terminal and the − terminal of a direct current (DC) power source. The switching elements may each be a metal-oxide-semiconductor field-effect-transistor (MOS-FET). The first current sensor 33a detects a first actual current value I1 which is the value of a current for each phase (U-phase, V-phase, and W-phase) that flows through a power supply path between the first drive circuit 34a and the first coil 25a.

The first microcomputer 32a acquires, in each predetermined control cycle, the first steering torque $\tau 1$ which is detected by the first torque sensor 40a, the first rotational angle $\theta 1$ which is detected by the rotational angle sensor 41, the vehicle speed V which is detected by the vehicle speed sensor 42, and the first actual current value I1 which is detected by the first current sensor 33a. The first microcomputer 32a generates a first PWM signal P1 based on the first steering torque $\tau 1$, the first rotational angle $\theta 1$, the vehicle speed V, and the first actual current value I1. The first drive circuit 34a converts DC power supplied from the DC power source (not illustrated) into 3-phase alternating current (AC) power by turning on and off the switching elements, which constitute the first drive circuit 34a, based on the first PWM signal P1 which is generated by the first microcomputer 32a in predetermined control cycles. Consequently, the first drive circuit 34a supplies 3-phase AC power to the first coil 25a.

The second oscillator 31b generates a second clock CLK2 at a basic frequency. The second oscillator 31b may be a crystal element, for example. The various portions of the second control system B operate at predetermined process timings based on the second clock CLK2.

The second drive circuit 34b is a drive circuit for three phases (U-phase, V-phase, and W-phase). The second drive circuit 34b is formed by connecting three arms, in each of which two switching elements are connected in series with each other, in parallel with each other between the + terminal and the − terminal of a DC power source. The second current sensor 33b detects a second actual current value I2 which is the value of a current for each phase (U-phase, V-phase, and W-phase) that flows through a power supply path between the second drive circuit 34b and the second coil 25b.

The second microcomputer 32b acquires, in each predetermined control cycle, the second steering torque $\tau 2$ which is detected by the second torque sensor 40b, the second rotational angle $\theta 2$ which is detected by the rotational angle sensor 41, the vehicle speed V which is detected by the vehicle speed sensor 42, and the second actual current value I2 which is detected by the second current sensor 33b. The second microcomputer 32b generates a second PWM signal P2 based on the second steering torque $\tau 2$, the second rotational angle $\theta 2$, the vehicle speed V, and the second actual current value I2. The second drive circuit 34b converts DC power supplied from the DC power source (not illustrated) into 3-phase AC power by turning on and off the switching elements, which constitute the second drive circuit 34b, based on the second PWM signal P2 which is generated by the second microcomputer 32b in predetermined control cycles. Consequently, the second drive circuit 34b supplies 3-phase AC power to the second coil 25b.

In this way, the first microcomputer 32a and the second microcomputer 32b control power supply to the first coil 25a of the first control system A and the second coil 25b of the second control system B through control on the first drive circuit 34a and the second drive circuit 34b.

Figure 3:
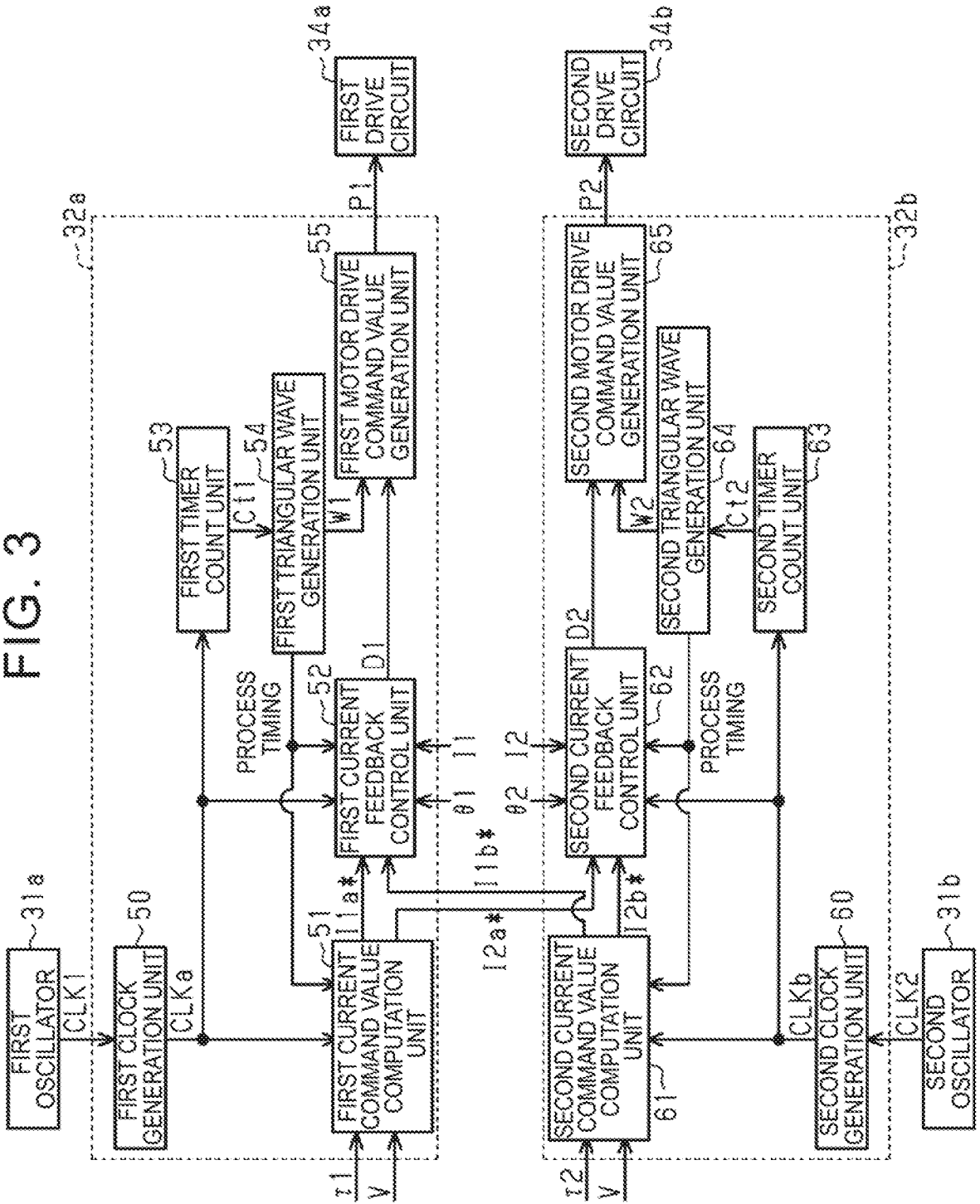
FIG. 3 is a block diagram illustrating a schematic configuration of a first microcomputer and a second microcomputer.

The function of the first microcomputer 32a and the second microcomputer 32b will be described. As illustrated in FIG. 3, the first microcomputer 32a has a first clock generation unit 50, a first current command value computation unit 51, a first current feedback control unit 52, a first timer count unit 53, a first triangular wave generation unit 54, and a first motor drive command value generation unit 55. Meanwhile, the second microcomputer 32b has a second clock generation unit 60, a second current command value computation unit 61, a second current feedback control unit 62, a second timer count unit 63, a second triangular wave generation unit 64, and a second motor drive command value generation unit 65. The first microcomputer 32a and the second microcomputer 32b determine that the first torque sensor 40a is abnormal in the case where the first steering torque $\tau 1$ which corresponds to rotation of the steering shaft 11 cannot be acquired from the first torque sensor 40a. Meanwhile, the first microcomputer 32a and the second microcomputer 32b determine that the second torque sensor 40b is abnormal in the case where the second steering torque $\tau 2$ which corresponds to rotation of the steering shaft 11 cannot be acquired from the second torque sensor 40b. In the case where the first torque sensor 40a is not abnormal, the first microcomputer 32a operates as a so-called master, and the second microcomputer 32b operates as a so-called slave. In the case where the first torque sensor 40a is abnormal, the first microcomputer 32a operates as the slave, and the second microcomputer 32b operates as the master. The first microcomputer 32a and the second microcomputer 32b use a command value computed by the microcomputer which operates as the master to control power supply, and do not use a command value computed by the microcomputer which operates as the slave to control power supply.

The first clock generation unit 50 is a multiplier. The first clock generation unit 50 generates a first clock CLKa for the first microcomputer 32a by multiplying the first clock CLK1, which is input from the first oscillator 31a, by a predetermined multiple. The first clock generation unit 50 outputs the generated first clock CLKa to the first current command value computation unit 51, the first current feedback control unit 52, and the first timer count unit 53.

The second clock generation unit 60 is a multiplier. The second clock generation unit 60 generates a second clock CLKb for the second microcomputer 32b by multiplying the second clock CLK2, which is input from the second oscillator 31b, by a predetermined multiple. The second clock generation unit 60 outputs the generated second clock CLKb to the second current command value computation unit 61, the second current feedback control unit 62, and the second timer count unit 63.

The first current command value computation unit 51 computes a first current command value I1a* and a second current command value I2a* based on the first steering torque τ1 which is detected by the first torque sensor 40a and the vehicle speed V which is detected by the vehicle speed sensor 42. The first current command value I1a* is a command value for controlling power supply to the first coil 25a. The first current command value I1a* corresponds to torque that should be generated by the motor 20 through power supply to the first coil 25a of the first control system A. Meanwhile, the second current command value I2a* is a command value for controlling power supply to the second coil 25b. The second current command value I2a* corresponds to torque that should be generated by the motor 20 through power supply to the second coil 25b of the second control system B. The first current command value computation unit 51 outputs the first current command value I1a* to the first current feedback control unit 52. In addition, the first current command value computation unit 51 transmits the second current command value I2a* to the second current feedback control unit 62 of the second microcomputer 32b through inter-microcomputer communication between the first microcomputer 32a and the second microcomputer 32b. The first command value computation unit can be considered as the first current command value computation unit 51.

The second current command value computation unit 61 computes a first current command value I1b* and a second current command value I2b* based on the second steering torque τ2 which is detected by the second torque sensor 40b and the vehicle speed V which is detected by the vehicle speed sensor 42. The first current command value I1b* is a command value for controlling power supply to the first coil 25a. The first current command value I1b* corresponds to torque that should be generated by the motor 20 through power supply to the first coil 25a of the first control system A. Meanwhile, the second current command value I2b* is a command value for controlling power supply to the second coil 25b. The second current command value I2b* corresponds to torque that should be generated by the motor 20 through power supply to the second coil 25b of the second control system B. The second current command value computation unit 61 outputs the second current command value I2b* to the second current feedback control unit 62. In addition, the second current command value computation unit 61 transmits the first current command value I1b* to the first current feedback control unit 52 through inter-microcomputer communication between the first microcomputer 32a and the second microcomputer 32b. The second command value computation unit can be considered as the second current command value computation unit 61.

The first current feedback control unit 52 acquires not only the first current command value I1a* and the first current command value I1b* but also the first rotational angle θ1 and the first actual current value I1. The first current feedback control unit 52 computes a first duty command value D1 using one of the first current command value I1a* and the first current command value I1b*. The first duty command value D1 is a command value that indicates the duty ratio in PWM control. In the case where the first microcomputer 32a operates as the master, the first current feedback control unit 52 computes the first duty command value D1 by executing first feedback control which is current feedback control based on the deviation between the first current command value I1a* and the first actual current value I1, in order to cause the first actual current value I1 to follow the first current command value I1a*. In the case where the second microcomputer 32b operates as the master, meanwhile, the first current feedback control unit 52 computes the first duty command value D1 by executing first feedback control which is current feedback control based on the deviation between the first current command value I1b* and the first actual current value I1, in order to cause the first actual current value I1 to follow the first current command value I1b*. The first current feedback control unit 52 outputs the computed first duty command value D1 to the first motor drive command value generation unit 55. The first feedback control unit can be considered as the first current feedback control unit 52.

The second current feedback control unit 62 acquires not only the second current command value I2a* and the second current command value I2b* but also the second rotational angle θ2 and the second actual current value I2. The second current feedback control unit 62 computes a second duty command value D2 using one of the second current command value I2a* and the second current command value I2b*. The second duty command value D2 is a command value that indicates the duty ratio in PWM control. In the case where the first microcomputer 32a operates as the master, the second current feedback control unit 62 computes the second duty command value D2 by executing second feedback control which is current feedback control based on the deviation between the second current command value I2a* and the second actual current value I2, in order to cause the second actual current value I2 to follow the second current command value I2a*. In the case where the second microcomputer 32b operates as the master, meanwhile, the second current feedback control unit 62 computes the second duty command value D2 by executing second feedback control which is current feedback control based on the deviation between the second current command value I2b* and the second actual current value I2, in order to cause the second actual current value I2 to follow the second current command value I2b*. The second current feedback control unit 62 outputs the computed second duty command value D2 to the second motor drive command value generation unit 65. The second feedback control unit can be considered as the second current feedback control unit 62.

The first timer count unit 53 includes a frequency divider and an up-down counter known in the art. The first timer count unit 53 increments and decrements, using the up-down counter, the number of clocks of the first clock CLKa which has been obtained by the frequency divider, and outputs a first count value Ct1 to the first triangular wave generation unit 54. The first timer count unit 53 switches increment and decrement in the case where the number of increments or decrements repeatedly performed reaches a predetermined upper-limit count value Ct0.

The second timer count unit 63 includes a frequency divider and an up-down counter known in the art. The second timer count unit 63 increments and decrements, using the up-down counter, the number of clocks of the second clock CLKb which has been obtained by the frequency divider, and outputs a second count value Ct2 to the second triangular wave generation unit 64. The upper-limit count value Ct0 is set to the same value for the first timer count unit 53 and the second timer count unit 63.

The first triangular wave generation unit 54 generates a triangular wave W1 (see FIG. 7) as a carrier wave based on the first count value Ct1 which is computed by the first timer count unit 53, and outputs the triangular wave W1 to the first motor drive command value generation unit 55. The first triangular wave generation unit 54 generates the triangular wave W1 by accumulatively adding signal levels determined in advance during increment and accumulatively subtracting signal levels determined in advance during decrement each time the first count value Ct1 is input. The thus generated triangular wave W1 is repeatedly varied between a high level H (so-called peak) and a low level L (so-called valley) in each predetermined cycle that corresponds to the upper-limit count value Ct0 of the first clock CLKa.

The first triangular wave generation unit 54 generates a process timing signal based on the generated triangular wave W1, and outputs the process timing signal to the first current command value computation unit 51 and the first current feedback control unit 52. The process timing of the first current command value computation unit 51 is the timing when the first current command value computation unit 51 executes a process of computing the first current command value I1a* and the second current command value I2a*. Meanwhile, the process timing of the first current feedback control unit 52 is the timing when the first current feedback control unit 52 executes feedback control. That is, such process timings are determined based on the timings of the vertexes of the peaks and the vertexes of the valleys in the triangular wave W1. The cycle of such process timings is set based on a period between the vertex of a peak and the vertex of a valley in the triangular wave W1, for example. The cycle of feedback control by the first current feedback control unit 52 is set to be shorter than the cycle of computation of the first current command value I1a* and the second current command value I2a* by the first current command value computation unit 51.

The second triangular wave generation unit 64 generates a triangular wave W2 (see FIG. 7) as a carrier wave based on the second count value Ct2 which is computed by the second timer count unit 63, and outputs the triangular wave W2 to the second motor drive command value generation unit 65. The second triangular wave generation unit 64 generates the triangular wave W2 by accumulatively adding signal levels determined in advance during increment and accumulatively subtracting signal levels determined in advance during decrement each time the second count value Ct2 is input. The thus generated triangular wave W2 is repeatedly varied between a high level H (so-called peak) and a low level L (so-called valley) in each predetermined cycle that corresponds to the upper-limit count value Ct0 of the second clock CLKb. The cycles in which the triangular waves W1 and W2 are repeatedly varied between the high level H and the low level L are set, in design, to be the same as each other.

The second triangular wave generation unit 64 generates a process timing signal based on the generated triangular wave W2, and outputs the process timing signal to the second current command value computation unit 61 and the second current feedback control unit 62. The process timing of the second current command value computation unit 61 is the timing when the second current command value computation unit 61 executes a process of computing the first current command value I1b* and the second current command value I2b*. Meanwhile, the process timing of the second current feedback control unit 62 is the timing when the second current feedback control unit 62 executes feedback control. Such process timings are determined based on the timings of the vertexes of the peaks and the vertexes of the valleys in the triangular wave W2. That is, the cycle of such process timings is set based on a period between of the vertex of a peak and the vertex of a valley in the triangular wave W2, for example. The cycle of feedback control by the second current feedback control unit 62 is set to be shorter than the cycle of computation of the first current command value I1b* and the second current command value I2b* by the second current command value computation unit 61. In addition, the cycle of computation of the first current command value I1b* and the second current command value I2b* by the second current command value computation unit 61 is set, in design, to be the same as the cycle of computation of the first current command value I1a* and the second current command value I1a* by the first current command value computation unit 51. In addition, the cycle of feedback control by the second current feedback control unit 62 is set, in design, to be the same as the cycle of feedback control by the first current feedback control unit 52.

The first motor drive command value generation unit 55 generates the first PWM signal P1 at a predetermined process timing based on the triangular wave W1 which is generated by the first triangular wave generation unit 54 and the first duty command value D1 which is computed by the first current feedback control unit 52. The first motor drive command value generation unit 55 outputs the generated first PWM signal P1 to the first drive circuit 34a. The process timing of the first motor drive command value generation unit 55 is the timing when the first motor drive command value generation unit 55 updates the first PWM signal P1 from the first PWM signal P1 for the preceding computation cycle to the first PWM signal P1 for the present computation cycle. In the first embodiment, the first PWM signal P1 is an on signal in the case where the first duty command value D1 is larger than the triangular wave W1, and an off signal in the case where the first duty command value D1 is smaller than the triangular wave W1. The cycle of update of the first PWM signal P1 by the first motor drive command value generation unit 55 is set to be shorter than the cycle of feedback control by the first current feedback control unit 52.

The second motor drive command value generation unit 65 generates the second PWM signal P2 at a predetermined process timing based on the triangular wave W2 which is generated by the second triangular wave generation unit 64 and the second duty command value D2 which is computed by the second current feedback control unit 62. The second motor drive command value generation unit 65 outputs the generated second PWM signal P2 to the second drive circuit 34b. The process timing of the second motor drive command value generation unit 65 is the timing when the second motor drive command value generation unit 65 updates the second PWM signal P2 from the second PWM signal P2 for the preceding computation cycle to the second PWM signal P2 for the present computation cycle. In the first embodiment, the second PWM signal P2 is an on signal in the case where the second duty command value D2 is larger than the triangular wave W2, and an off signal in the case where the second duty command value D2 is smaller than the triangular wave W2. The cycle of update of the second PWM signal P2 by the second motor drive command value generation unit 65 is set to be shorter than the cycle of feedback control by the second current feedback control unit 62.

Figure 4:
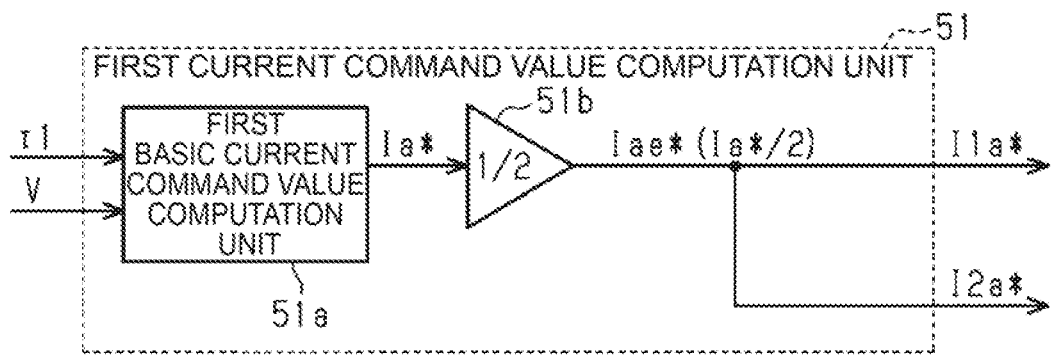
FIG. 4 is a block diagram illustrating a schematic configuration of a first current command value computation unit.

The function of the first current command value computation unit 51 will be described with reference to FIG. 4. The first current command value computation unit 51 includes a first basic current command value computation unit 51a and an equal distribution unit 51b. The second current command value computation unit 61 also has constituent elements that are similar to those of the first current command value computation unit 51.

The first basic current command value computation unit 51a computes a basic current command value Ia*, which is the sum of the first current command value I1a* and the second current command value I1a*, based on the first steering torque τ1 and the vehicle speed V.

Figure 5:
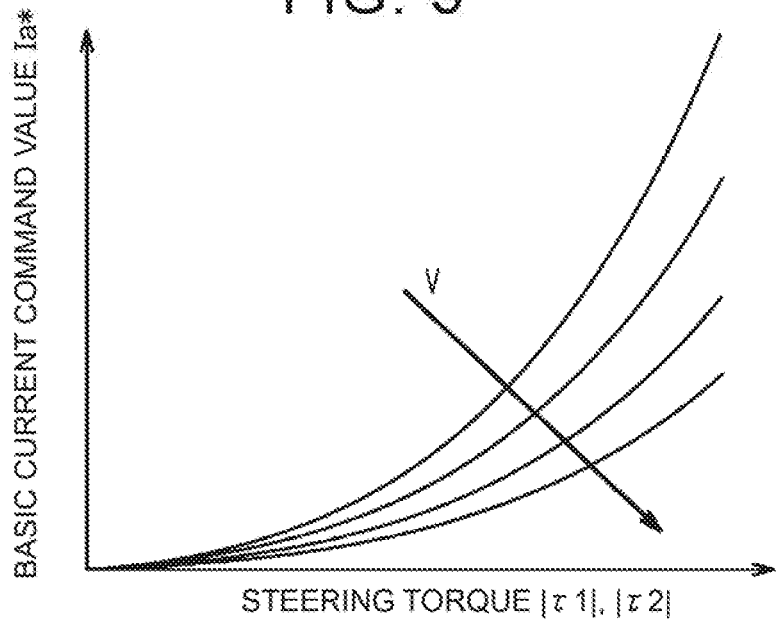
FIG. 5 is a graph indicating the relationship between a basic current command value and steering torque.

Specifically, as indicated in FIG. 5, the first basic current command value computation unit 51a computes the basic current command value Ia* which has a larger absolute value as the absolute value of the input first steering torque τ1 is larger and as the vehicle speed V is lower. The ratio (|ΔIa*/Δτ1|) of the amount of variation |ΔIa*| in the absolute value of the basic current command value Ia* to the amount of variation |Δτ1| in the absolute value of the first steering torque τ1 is higher as the absolute value of the first steering torque τ1 is larger. Whether the first steering torque τ1 is positive or negative is determined based on whether the steering wheel 10 is steered rightward or steered leftward. The basic current command value Ia* which is computed by the first basic current command value computation unit 51a also has a positive or negative sign, depending on whether the sign of the first steering torque τ1 is positive or negative.

The equal distribution unit 51b multiplies the input basic current command value Ia* by "½". That is, the equal distribution unit 51b computes an equal command value Iae* ("Ia*/2") obtained by equally dividing the basic current command value Ia*. The equal command value Iae* which is computed by the equal distribution unit 51b is output, as it is, as the first current command value I1a* and the second current command value I2a*. In short, the first current command value I1a* and the second current command value I2a* which are computed by the equal distribution unit 51b are set to equal values.

The equal command value Iae* becomes larger as the absolute values of the first steering torque τ1 and the second steering torque τ2 become larger. The relationship between the equal command value Iae* and the absolute values of the first steering torque τ1 and the second steering torque τ2 is the same as the relationship which is indicated by curves with half the slope of the relationship between the basic current command value Ia* and the absolute values of the first steering torque τ1 and the second steering torque τ2 indicated in FIG. 5 on condition that the vehicle speed V is the same. Therefore, the slope of the equal command value Iae* with respect to the first steering torque τ1 and the second steering torque τ2 is larger as the absolute values of the first steering torque τ1 and the second steering torque τ2 are larger.

Figure 6:
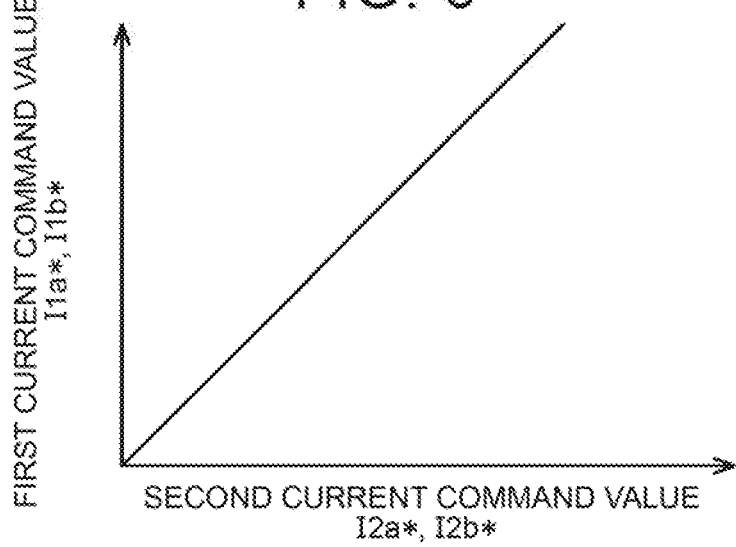
FIG. 6 is a graph indicating the relationship between a first current command value and a second current command value.

In FIG. 6, the second current command values I2a* and I2b* are plotted on the horizontal axis, and the first current command values I1a* and I1b* are plotted on the vertical axis. FIG. 6 indicates the relationship for a case where the first current command values I1a* and I1b* and the second current command values I1a* and I2b* are the same.

In the first embodiment, the computation process by the first current command value computation unit 51 and the second current command value computation unit 61, the feedback control by the first current feedback control unit 52 and the second current feedback control unit 62, and the update process by the first motor drive command value generation unit 55 and the second motor drive command value generation unit 65 are performed at process timings generated based on the first clock CLKa and the second clock CLKb.

Figure 7:
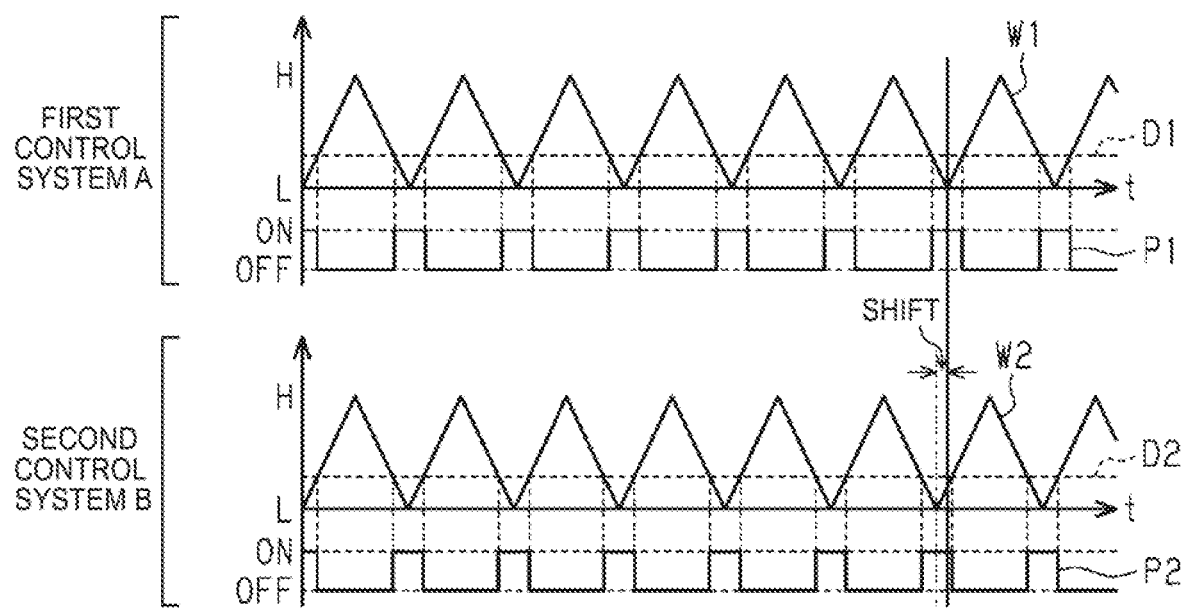
FIG. 7 indicates a temporal shift between pulse width modulation (PWM) signals for a first control system and a second control system.

For example, in the first control system A, as indicated in FIG. 7, the first motor drive command value generation unit 55 turns on and off the switching elements, for example, at timings corresponding to the vertexes of the peaks and the vertexes of the valleys of the triangular wave W1 which is generated by the first triangular wave generation unit 54. In addition, the first current command value computation unit 51 and the first current feedback control unit 52 execute the respective processes based on the timings corresponding to the vertexes of the peaks and the vertexes of the valleys of the triangular wave W1 which is generated by the first triangular wave generation unit 54. This also applies to the second control system B. In the first embodiment, the cycles of the process timings of the various portions of the first control system A and the second control system B are set, in design, to be the same. The time which is prescribed by the first control system A and the time which is prescribed by the second control system B are the same if the cycle of the first oscillator 31a and the cycle of the second oscillator 31b are not fluctuated. However, the process timings of the various portions of the first control system A are prescribed using the first oscillator 31a, and that the process timings of the various portions of the second control system B are prescribed using the second oscillator 31b which is separate from the first oscillator 31a. The first microcomputer 32a of the first control system A and the second microcomputer 32b of the second control system B control power supply to the coils 25 independently, rather than synchronously. The term "synchronous" refers to a state in which the process timings of the first control system A and the process timings of the second control system B match each other. In the present embodiment, the first microcomputer 32a and the second microcomputer 32b according to the first embodiment execute the respective processes non-synchronously.

Figure 8:
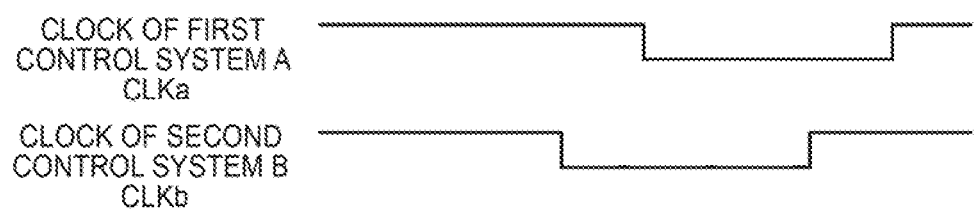
FIG. 8 indicates a shift between clocks for the first control system and the second control system.

As indicated in FIGS. 7 and 8, the cycles of the clocks from the oscillators are occasionally fluctuated among individuals because of fluctuations in the manufacture of the oscillators, degradations, fluctuations in the material, etc. For example, the cycles of the clocks from the oscillators are fluctuated among individuals in the case where the crystal elements of the oscillators are fluctuated among individuals. From the above, the cycle of the first clock CLK1 from the first oscillator 31a of the first control system A and the cycle of the second clock CLK2 from the second oscillator 31b of the second control system B occasionally differ from each other. In this case, the time which is prescribed by the first control system A and the time which is prescribed by the second control system B differ from each other. Such a shift between the first clock CLK1 and the second clock CLK2 is not resolved, but has a ripple effect on the first count value Ct1 from the first timer count unit 53 and further on the triangular wave W1 from the first triangular wave generation unit 54 to eventually cause a temporal shift between the process timings of the first control system A and the second control system B. The shift between the first clock CLK1 and the second clock CLK2 also has a ripple effect on the second count value Ct2 from the second timer count unit 63 and further on the triangular wave W2 from the second triangular wave generation unit 64 to eventually cause a temporal shift between the process timings of the first control system A and the second control system B. Consequently, a temporal shift is caused between the process timings of the first current command value computation unit 51 and the second current command value computation unit 61, a temporal shift is caused between the process timings of the first current feedback control unit 52 and the second current feedback control unit 62, and a temporal shift is caused between the process timings of the first motor drive command value generation unit 55 and the second motor drive command value generation unit 65.

As indicated in FIG. 7, the shift between the process timings of the first control system A and the process timings of the second control system B may be varied temporally. That is, the temporal shift between the process timings of the first control system A and the second control system B becomes larger as the time elapses in the case where the cycles of the clocks from the oscillators are fluctuated among individuals. Such temporal variations in the shift between the process timings are repeated in predetermined cycles. Consequently, the second microcomputer 32b cannot grasp the second current command value I2a* which is computed by the first current command value computation unit 51, even if the second current command value I2a* is computed by the first current command value computation unit 51, for example, until communication is performed between the first microcomputer 32a and the second microcomputer 32b. The second current feedback control unit 62 of the second microcomputer 32b performs the feedback control using the second current command value I2a* which was received when the preceding communication was established, even if a new second current command value I2a* is computed by the first current command value computation unit 51, until communication is established between the first microcomputer 32a and the second microcomputer 32b. The second current command value I2a* which was received when the preceding communication was established is a second current command value I2a* computed in the past computation cycle, which was computed earlier than the second current command value I2a* which is computed in the present computation cycle. In this way, the second current feedback control unit 62 of the second microcomputer 32b of the second control system B performs the feedback control using the second current command value I2a* from the past computation cycle, which was computed earlier than the second current command value I2a* which is computed in the present computation cycle. This also applies to a case where the first current feedback control unit 52 performs the feedback control using the first current command value I1b* which is computed by the second current command value computation unit 61. In this case, the first current feedback control unit 52 performs the feedback control using the first current command value I1b* from the past computation cycle until communication is performed between the first microcomputer 32a and the second microcomputer 32b. In the feedback control, it is optimal to use the newest command value computed by the first microcomputer 32a which operates as the master. That is, it is optimal if the first microcomputer 32a and the second microcomputer 32b perform the feedback control using as newer a current command value as possible.

Thus, in the first embodiment, the following configuration is adopted in order that drive of the motor 20 can be controlled with the first control system A and the second control system B using current command values from more optimal computation cycles by shortening a period for which the first current feedback control unit 52 and the second current feedback control unit 62 perform the feedback control using current command values from the past computation cycles. That is, the cycle of the inter-microcomputer communication between the first microcomputer 32a and the second microcomputer 32b is set to be the same as the cycle of computation of each of the first current command value I1a* and the second current command value I2a* by the first current command value computation unit 51. In addition, the cycle of the inter-microcomputer communication between the first microcomputer 32a and the second microcomputer 32b is set to be the same as the cycle of computation of the first current command value I1b* and the second current command value I2b* by the second current command value computation unit 61.

The functions and the effects of the first embodiment will be described.

(1) A case where the cycle of communication between the first control system A and the second control system B is set to be longer than each of the cycles of computations of the current command values by the first current command value computation unit 51 and the second current command value computation unit 61 will be described as a comparative example. Here, a case where the cycle of communication between the first control system A and the second control system B is set to five times the cycle of computation of the current command values by the first current command value computation unit 51 and the second current command value computation unit 61 will be described.

Figure 9:
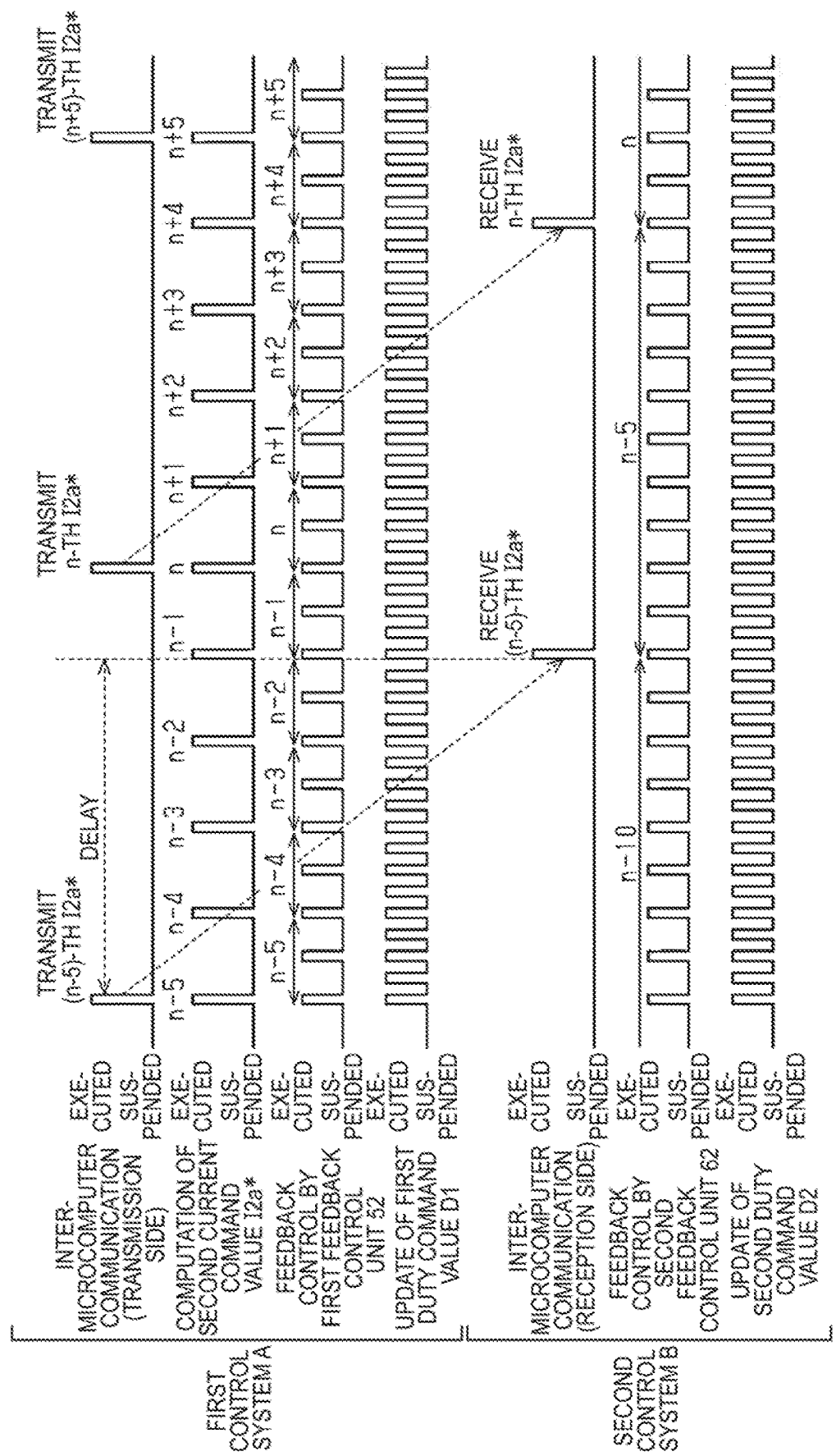
FIG. 9 indicates the process timings of various portions of a first control system and the process timings of various portions of a second control system in a comparative example.

In the comparative example, as indicated in FIG. 9, a temporal shift is caused between the process timings of the first control system A and the second control system B. By way of example, the process timings of the second control system B are delayed by four times the cycle of computation of the second current command value I2a* by the first current command value computation unit 51 with respect to the process timings of the first control system A. For example, at the process timing of computation of the n-th second current command value I2a*, the n-th second current command value I2a* is transmitted from the first control system A side, and the first current feedback control unit 52 executes the feedback control using the n-th first current command value I1a*. Since the second control system B is temporally delayed, meanwhile, the second control system B side cannot receive the n-th second current command value I2a* at the timing when the n-th second current command value I2a* is computed. The second control system B side can grasp the n-th second current command value I2a* at the timing when inter-microcomputer communication is established, that is, at the timing when the second control system B receives the second current command value I2a*. The timing when the second control system B can receive the second current command value I2a* is delayed because of the temporal delay, while the second current feedback control unit 62 could execute the feedback control using the n-th second current command value I2a* at the timing when the n-th second current command value I2a* was computed if there were no temporal delay. The second control system B can receive the n-th second current command value I2a* at the timing when the (n+4)-th second current command value I2a*, which is delayed by four times the cycle of computation of the second current command value I2a*, is computed because of the temporal shift (here, delay). It is optimal if the second current feedback control unit 62 performs the feedback control using the n-th second current command value I2a* at the time when the n-th second current command value I2a* is transmitted from the first control system A side. The second current feedback control unit 62 performs the feedback control using the (n−5)-th second current command value I2a*, which was received when the preceding inter-microcomputer communication was established, since the n-th second current command value I2a* cannot be grasped at the timing when the n-th second current command value I2a* is computed. The (n−5)-th second current command value I2a* is a current command value that received by the second current feedback control unit 62 and should be used for the feedback control at the time when inter-microcomputer communication was performed in the preceding cycle in the case where the cycles of the clocks from the oscillators are not fluctuated among individuals. In the case where the first current command value computation unit 51 computes the second current command value I2a* for the present computation cycle immediately after communication is performed between the first microcomputer 32a and the second microcomputer 32b, the second current feedback control unit 62 performs the feedback control using the second current command value I2a*, which was received when the preceding inter-microcomputer communication was established, for up to about the cycle of communication. In this way, the second current feedback control unit 62 performs the feedback control using the second current command value I2a* from the past computation cycle, which was computed earlier than the second current command value I2a* which is computed in the present computation cycle, and thus power supply to the coils 25 of the motor 20 may not be optimal. In this case, torque ripple may be caused. A similar issue is also caused when the first current feedback control unit 52 performs the feedback control using the first current command value I1b* which is computed by the second current command value computation unit 61.

Figure 10:
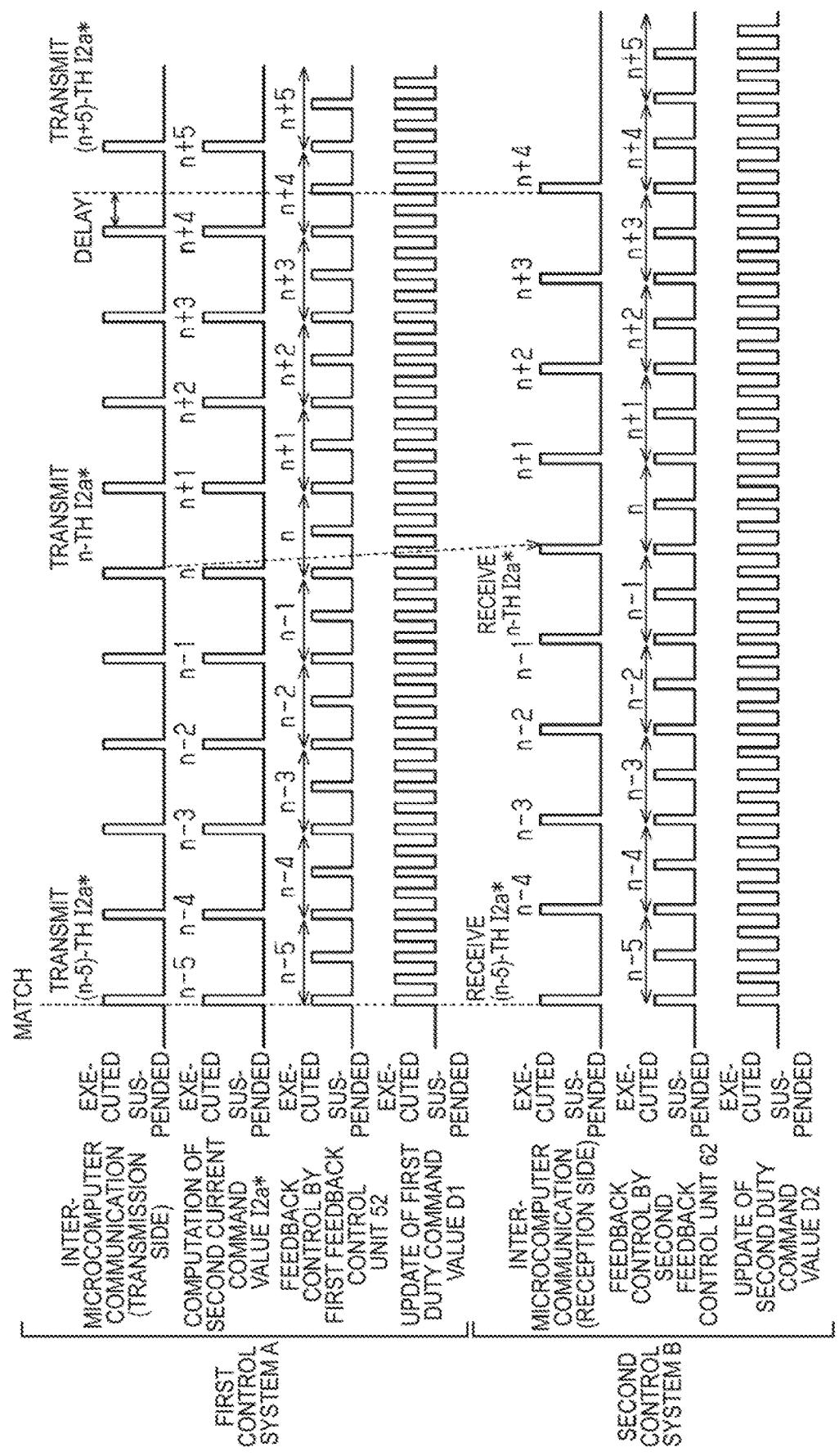
FIG. 10 indicates the process timings of various portions of the first control system and the process timings of various portions of the second control system.

In the first embodiment, as indicated in FIG. 10, a temporal delay is caused between the process timings of the first control system A and the second control system B, as in the comparative example. For example, at the process timing of computation of the n-th second current command value I2a*, the n-th second current command value I2a* is transmitted from the first control system A side, and the first current feedback control unit 52 executes the feedback control using the n-th first current command value I1a*. Since the second control system B is temporally delayed with respect to the first control system A, meanwhile, the second control system B side cannot receive the n-th second current command value I2a* at the timing when the n-th second current command value I2a* is computed. In the first embodiment, the cycle of communication between the first control system A and the second control system B is set to be the same as the cycles of computations of the current command values by the first current command value computation unit 51 and the second current command value computation unit 61. Thus, the period for which the second control system B cannot grasp the second current command value I2a* which is computed in the present computation cycle can be shortened, even if the first current command value computation unit 51 computes the second current command value I2a* immediately after communication is performed between the first control system A and the second control system B, since the cycle of communication is the same as the cycle of computation of the current command values. The period for which the second control system B cannot grasp the second current command value I2a* for the present computation cycle is a period for which the second current command value I2a* cannot be reflected in the feedback control, even if the first control system A has transmitted the second current command value I2a*, since the second control system B has not received the second current command value I2a*. That is, the second control system B side cannot receive the n-th second current command value I2a* at the timing when the n-th second current command value I2a* is computed, but the second control system B side can receive the n-th second current command value I2a* by the timing when the (n+1)-th second current command value I2a* is computed. Consequently, the period for which the second current feedback control unit 62 performs the feedback control using the second current command value I2a* which was received when the preceding inter-microcomputer communication was established can be shortened. The period for which the second current feedback control unit 62 performs the feedback control using the second current command value I2a* which was received when the preceding inter-microcomputer communication was established is the period for which the second control system B cannot grasp the second current command value I2a* which is computed in the present computation cycle. Similarly, the period for which the first control system A cannot grasp the first current command value I1b* which is computed in the present computation cycle can be shortened, even if the second current command value computation unit 61 computes the first current command value I1b* immediately after communication is performed between the first control system A and the second control system B, since the cycle of communication is the same as the cycle of computation of the current command values. Therefore, the period for which the first current feedback control unit 52 and the second current feedback control unit 62 perform the feedback control using the current command values from the past computation cycle, which were computed earlier than the current command values which are computed in the present computation cycle, can be shortened. Consequently, torque ripple can be suppressed. In this manner, drive of the motor 20 can be controlled with the control systems using current command values from more optimal computation cycles.

(2) In the case where the first microcomputer 32a and the second microcomputer 32b execute the respective processes synchronously, the first microcomputer 32a and the second microcomputer 32b are synchronized with each other by resetting the first microcomputer 32a and the second microcomputer 32b in the case where the temporal shift between the process timings of the first microcomputer 32a and the second microcomputer 32b exceeds a predetermined value. In the case where the first microcomputer 32a and the second microcomputer 32b execute the respective processes non-synchronously, however, temporal variations in the shift between the process timings of the first microcomputer 32a and the second microcomputer 32b cannot be resolved, even if such temporal variations are caused. The configuration according to the first embodiment is suitable for the first microcomputer 32a and the second microcomputer 32b which perform the respective processes non-synchronously, and can shorten the period for which the first current feedback control unit 52 and the second current feedback control unit 62 perform the feedback control using the command values from the past computation cycle, which were computed earlier than the command values which are computed in the present computation cycle.

Second Embodiment

A second embodiment in which a steering control device is applied to an EPS will be described. Differences from the first embodiment will be mainly described.

In the second embodiment, the cycle of the inter-microcomputer communication between the first microcomputer 32a and the second microcomputer 32b is set to be the same as each of the cycles of the feedback controls by the first current feedback control unit 52 and the second current feedback control unit 62.

The functions and the effects of the second embodiment will be described.

(3) In the second embodiment, the cycle of the inter-microcomputer communication between the first microcomputer 32a and the second microcomputer 32b is set to be the same as each of the cycles of the feedback controls by the first current feedback control unit 52 and the second current feedback control unit 62, which is further shorter than each of the cycles of computations of the current command values by the first current command value computation unit 51 and the second current command value computation unit 61. Consequently, the period for which the first current feedback control unit 52 and the second current feedback control unit 62 perform the feedback control using the command values from the past computation cycle, which were computed earlier than the command values which are computed in the present computation cycle, can be further shortened.

Third Embodiment

A third embodiment in which a steering control device is applied to an EPS will be described. Differences from the first embodiment will be mainly described.

In the third embodiment, the cycle of the inter-microcomputer communication between the first microcomputer 32a and the second microcomputer 32b is set to be the same as each of the cycle of update of the first PWM signal P1 by the first motor drive command value generation unit 55 and the cycle of update of the second PWM signal P2 by the second motor drive command value generation unit 65.

The functions and the effects of the third embodiment will be described.

(4) In the third embodiment, the cycle of the inter-microcomputer communication between the first microcomputer 32a and the second microcomputer 32b is set to be the same as each of the cycles of updates of the first PWM signal P1 and the second PWM signal P2, which is further shorter than each of the cycles of the feedback controls by the first current feedback control unit 52 and the second current feedback control unit 62. Consequently, the period for which the first current feedback control unit 52 and the second current feedback control unit 62 perform the feedback control using the command values from the past computation cycle, which were computed earlier than the command values which are computed in the present computation cycle, can be further shortened.

The embodiments may be modified as follows. The following other embodiments may be combined with each other as long as the embodiments do not technically contradict with each other.

While two control systems, namely the first control system A and the second control system B, are provided in each of the embodiments, three or more control systems may be provided. In this case, the microcomputer of each control system may control power supply such that each coil generates torque at a value obtained by dividing the maximum torque of the motor 20 by the number of the control systems.

The first current command value computation unit 51 and the second current command value computation unit 61 may set the first current command values I1a* and I1b* and the second current command values I2a* and I2b* to different values in the case where the first steering torque τ1 and the second steering torque τ2 are equal to or less than a predetermined value.

While the first current command value computation unit 51 computes the basic current command value Ia* based on the first steering torque τ1 and the vehicle speed V, the first current command value computation unit 51 may compute the basic current command value Ia* based on only the first steering torque τ1. In addition, while the second current command value computation unit 61 computes the basic current command value Ia* based on the second steering torque τ2 and the vehicle speed V, the second current command value computation unit 61 may compute the basic current command value Ia* based on only the second steering torque τ2. It is also possible to separately provide an external ECU that computes a command value, on which a command value for torque that should be generated by the motor 20 is based, and that outputs the command value to the steering control device 30.

The first current command value computation unit 51 transmits the second current command value I2a* through the inter-microcomputer communication between the first microcomputer 32a and the second microcomputer 32b. However, the applicable embodiment is not limited thereto. In addition, the second current command value computation unit 61 transmits the first current command value I1b* through the inter-microcomputer communication between the first microcomputer 32a and the second microcomputer 32b. However, the applicable embodiment is not limited thereto. That is, the first current command value computation unit 51 and the second current command value computation unit 61 may compute a command value for torque that should be generated by the motor 20, rather than a current command value, and transmit the command value through the inter-microcomputer communication.

Each embodiment may be applied to a mechatronic motor device in which the motor 20 and the steering control device 30 are configured integrally with each other.

The rotational angle sensor 41 may include a magnetoresistive (MR) sensor, a Hall sensor, or a resolver.

The first rotational angle θ1 to be grasped by the first microcomputer 32a and the second rotational angle θ2 to be grasped by the second microcomputer 32b are detected by the same rotational angle sensor 41. However, the applicable embodiment is not limited thereto. For example, the first rotational angle θ1 to be grasped by the first microcomputer 32a may be detected by a first rotational angle sensor, and the second rotational angle θ2 to be grasped by the second microcomputer 32b may be detected by a second rotational angle sensor that is different from the first rotational angle sensor.

In the first embodiment, the cycle of the inter-microcomputer communication between the first microcomputer 32a and the second microcomputer 32b is set to be the same as the cycles of computations of the current command values by the first current command value computation unit 51 and the second current command value computation unit 61. However, the applicable embodiment is not limited thereto. The cycle of the inter-microcomputer communication between the first microcomputer 32a and the second microcomputer 32b may be set to be shorter than the cycle of computation of the first current command value I1a* and the second current command value I1a* by the first current command value computation unit 51.

In the second embodiment, the cycle of the inter-microcomputer communication between the first microcomputer 32a and the second microcomputer 32b is set to be the same as each of the cycles of the feedback controls by the first current feedback control unit 52 and the second current feedback control unit 62. However, the applicable embodiment is not limited thereto. The cycle of the inter-microcomputer communication between the first microcomputer 32a and the second microcomputer 32b may be set to be shorter than each of the cycles of the feedback controls by the first current feedback control unit 52 and the second current feedback control unit 62.

In the third embodiment, the cycle of the inter-microcomputer communication between the first microcomputer 32a and the second microcomputer 32b is set to be the same as each of the cycle of update of the first PWM signal P1 by the first motor drive command value generation unit 55 and the cycle of update of the second PWM signal P2 by the second motor drive command value generation unit 65. However, the applicable embodiment is not limited thereto. The cycle of the inter-microcomputer communication between the first microcomputer 32a and the second microcomputer 32b may be set to be shorter than each of the cycle of update of the first PWM signal P1 by the first motor drive command value generation unit 55 and the cycle of update of the second PWM signal P2 by the second motor drive command value generation unit 65. The cycle of the inter-microcomputer communication between the first microcomputer 32a and the second microcomputer 32b may be set, for example, to be the same as the cycle of each of the first clock CLK1 generated by the first oscillator 31a and the second clock CLK2 generated by the second oscillator 31b.

In each embodiment, the first current command value computation unit 51 outputs command values to the first current feedback control unit 52 and the second current feedback control unit 62 even in the case where the first microcomputer 32a operates as the slave. However, the first current command value computation unit 51 may not output command values in such a case. In each embodiment, in addition, the second current command value computation unit 61 outputs command values to the first current feedback control unit 52 and the second current feedback control unit 62 even in the case where the second microcomputer 32b operates as the slave. However, the second current command value computation unit 61 may not output command values in such a case.

In each embodiment, the first microcomputer 32a operates as the master in accordance with the situation, while the second microcomputer 32b operates as the slave in accordance with the situation. However, the applicable embodiment is not limited thereto. The first microcomputer 32a may be caused to always operate as the master, while the second microcomputer 32b may be caused to always operate as the slave. In this case, the second microcomputer 32b which operates as the slave may not have the second current command value computation unit 61. In this case, the first microcomputer 32a operates as a master control unit, and the second microcomputer 32b operates as a slave control unit. In addition, the first current command value I1a* is a master command value, and the second current command value I1a* is a slave command value. In addition, the first oscillator 31a is a master oscillator, and the second oscillator 31b is a slave oscillator.

In each embodiment, the steering system is embodied as the EPS 1 in which an assist force is applied to the steering shaft 11 by the motor 20. However, the applicable embodiment is not limited thereto. For example, the steering system may be embodied as the EPS 1 in which an assist force is applied to the rack shaft 12 by the motor 20 which has the rotary shaft 21 disposed in parallel with the rack shaft 12. Alternatively, the steering system may be embodied as a steer-by-wire system. That is, the steering system may be any system in which power is applied to the steering mechanism 2 by the motor 20.

The technical ideas that can be grasped from the embodiments and the modifications described above will be additionally described together with the effects thereof. A steering control device including: a plurality of control systems that control drive of a motor, which applies torque to a steering mechanism; a plurality of coils provided for each of the plurality of control systems; a master control unit that computes a command value for controlling power supply to the plurality of coils; and a slave control unit that operates based on the command value which is computed by the master control unit, in which: the master control unit operates at a process timing based on a clock input from a master oscillator; the slave control unit operates at a process timing based on a clock input from a slave oscillator; the master control unit has a function of computing a master command value for controlling power supply to the coils corresponding to the master control unit and a slave command value for controlling power supply to the coils corresponding to the slave control unit and transmitting the slave command value through communication with the slave control unit; and the cycle of communication between the master control unit and the slave control unit is set to be equal to or shorter than the cycle of computation of the command value by the master control unit.

With the above configuration, the cycle of communication between the master control unit and the slave control unit is set to be equal to or shorter than each of the cycles of computations of the master command value and the slave command value by the master control unit and the slave control unit. From the above, the period for which the slave control unit cannot grasp the slave command value which is computed in the present computation cycle can be shortened, even if the master control unit computes the slave command value immediately after communication between the master control unit and the slave control unit is performed because of fluctuations in the cycle of the clocks from the oscillators, since the cycle of communication is equal to or shorter than the cycle of computation of the command values. Consequently, the period for which the slave control unit controls power supply using the slave command value which was computed in the past computation cycle and which was received when the preceding communication was established can be shortened. Therefore, the period for which the slave control unit controls power supply using the slave command value from the past computation cycle, which was computed earlier than the slave command value which is computed in the present computation cycle, can be shortened. That is, a shift between the process timing of the master control unit and the process timing of the slave control unit can be suppressed. Consequently, torque ripple can be suppressed. In this manner, drive of the motor can be controlled with the control systems using command values from more optimal computation cycles.

What is claimed is:

1. A steering control device that controls drive of a motor, which applies torque to a steering mechanism, through a plurality of control systems, the steering control device comprising:
a first control system provided with a first coil and configured to control power supply to the first coil; and
a second control system provided with a second coil and configured to control power supply to the second coil, wherein:
the first control system includes a first oscillator and a first microcomputer, the first microcomputer being configured to generate a clock for prescribing a process timing of the first microcomputer based on a first clock input from the first oscillator, the first microcomputer being configured to compute a first command value for controlling power supply to the first coil and a second command value for controlling power supply to the second coil, and the first microcomputer being configured to execute first feedback control, which cause a value of a first actual current, which is supplied to the first coil, to follow the first command value;
the second control system includes a second oscillator and a second microcomputer, the second microcomputer being configured to generate a clock for prescribing a process timing of the second microcomputer based on a second clock input from the second oscillator, the second microcomputer being configured to compute the first command value and the second command value, and the second microcomputer being configured to execute second feedback control, which cause a value of a second actual current, which is supplied to the second coil, to follow the second command value;
the first microcomputer and the second microcomputer are configured to communicate the first command value and the second command value with each other by the first microcomputer transmitting the computed second command value to the second microcomputer and the second microcomputer transmitting the computed first command value to the first microcomputer;
the first microcomputer is configured to execute the first feedback control using the first command value that is computed by the first microcomputer or the first command value that is computed by the second microcomputer, and the second microcomputer is configured to execute the second feedback control using the second command value that is computed by the first microcomputer or the second command value that is computed by the second microcomputer; and
the process timing of the first microcomputer and the process timing of the second microcomputer set a cycle of communication between the first microcomputer and the second microcomputer is set to be equal to or shorter than each of cycles of computations of the first command value and the second command value by the first microcomputer and the second microcomputer;
wherein the cycle of the communication between the first microcomputer and the second microcomputer is set to be equal to or shorter than each of cycles of the first feedback control and the second feedback control by the first microcomputer and the second microcomputer, and the first microcomputer and the second microcomputer are configured to perform the first feedback control and the second feedback control in a cycle that is shorter than each of the cycles of the computations of the first command value and the second command value by the first microcomputer and the second microcomputer.

2. The steering control device according to claim 1, wherein:
the first control system includes a first drive circuit, and the second control system includes a second drive circuit;
the first microcomputer is configured to compute a first duty command value through the first feedback control;
the first microcomputer is configured to generate a first PWM signal based on the first duty command value;
the first drive circuit is configured to execute power supply to the first coil based on the first PWM signal;
the second microcomputer is configured to compute a second duty command value through the second feedback control;
the second microcomputer is configured to generate a second PWM signal based on the second duty command value;
the second drive circuit is configured to execute power supply to the second coil based on the second PWM signal; and
the cycle of the communication between the first microcomputer and the second microcomputer is set to be equal to or shorter than each of a cycle of update of the first PWM signal and a cycle of update of the second PWM signal, and each of the cycle of update of the first PWM signal and the cycle of update of the second PWM signal is set to be shorter than each of cycles of the first feedback control and the second feedback control by the first microcomputer and the second microcomputer.

* * * * *